Patented July 23, 1935

2,009,135

UNITED STATES PATENT OFFICE 2,009,135

ACID MILK FOOD PRODUCT AND PROCESS FOR MAKING THE SAME

William P. M. Grelck, Baltimore, Md.

No Drawing. Application March 5, 1934, Serial No. 714,203

4 Claims. (Cl. 99—11)

My invention relates to an acid milk product in which its protein content consists of coagulated and then precipitated albumen and casein in minutely divided, fixed, particules of soft body and texture; its serum is practically free from albumen and casein in colloidal or suspended form; its lactic acid content is variable, it may be of a comparatively low percentage, not sufficient for self preservation and may be raised to a self preserving quantity or higher.

This specification is a continuation in part of my specification filed January 16, 1932 under Serial No. 652,100. In my specification filed May 18, 1932 under Serial No. 612,162 I refer to my Patent No. 1,230,479 dated June 19, 1917 in which I describe a process for making a self preserving acid milk product from soured milk or buttermilk and that the process produced a casein precipitate in the form of minutely divided, fixed, particles of a hard sandy like texture. Homogenizing the treated milk may make the casein particles smaller but does not change its hard sandy like texture, crystallization of part of the sugar of milk takes place, this is an undersirable feature and together with its casein content in the form of finely divided, fixed, particles of hard and sandy like texture has confined the use of the product mainly as a feed for animals.

In my specification filed May 18, 1932, Serial No. 612,162 I describe a process which is an improvement over my Patent No. 1,230,479, and produces a casein and albumen precipitate of soft body and texture, and its serum free from non-coagulated albumen acts as a preventive against crystallization of sugar of milk. I further stated that the greater the degree of concentration or amount of total solids in the finished product, the less lactic acid is required for its self preservation.

The object of my invention is to produce an acid milk food product from skimmed milk, buttermilk, whole milk, part whole milk, enriched whole milk or cream, or reconstituted cream or milk, in which the titratable acid content in terms of lactic acid may be from about 0.5% to about 4% however it may be carried to 8%; none or part or nearly all of its moisture may be removed by evaporation in vacuo or other suitable method. At times it is desirable to manufacture the product from skimmed milk or buttermilk and carry the finished product for a number of months in storage, in that case the fermentation for the development of lactic acid is carried sufficiently high so that the finished product may have a self preserving content of lactic acid from about 3% to 8%. Its milk protein content consists of minutely divided particles in fixed or nonadherent form of soft body and texture, precipitated by the agency of heat and simultaneous agitation from a coagulum containing both the coagulated albumen and casein. The soft body and texture of such milk protein particles are similar to the curd as in cottage cheese or in cream cheese. The serum of the product is practically free from colloidal or non-coagulated albumen and casein. The finished product of semisolid consistency with part of its moisture content removed, may be dried by removing practically all of its moisture content. I do not confine myself to treating fresh skimmed milk, but also buttermilk, especially buttermilk churned from neutralized cream, part whole milk, whole milk, whole milk enriched with butterfat, cream or re-constituted milk or cream may be used as milk material to be treated by my process.

The first step in treating the fresh milk material is heating the same up to the boiling point or to about 210 to 212 degrees Fahrenheit and then let it remain at this temperature for about 10 to 20 minutes so as to practically coagulate all of its albumen. (In normal milk the casein is in the form of a calcium caseinate and colloidally dispersed or suspended in it. The milk albumen or albumin is similar to blood albumin and is uncombined with base and believed to be present in milk in the form of colloidal dispersion or suspension and is coagulated by heat. Hunziker in his book "Condensed Milk and Milk Powder" p. 301 states Rupp found that at the boiling point of milk practically all of the albumen is coagulated. Rupp, U. S. Dep't Agr. B. A. I. Bull. 166, 1913.) The second step is to cool the so treated milk to the desired fermenting temperature to from between 65 to 100 degrees Fahrenheit, according to the specie of lactic acid bacteria used for ripening the treated milk and the amount of rennet used. If a finished product of a low acid content of about 0.5% is desired, rennet may be used with the lactic acid culture. For a lactic acid content of about 0.8% or higher, the use of rennet may be omitted. The third step is adding a sufficient amount of ferment or starter containing the desired strain of lactic acid producing bacteria. For a finished product containing about 0.5% of lactic acid, rennet is added together with a small amount of calcium chloride dissolved in water (about one pound of it to 50,000 lbs. of the treated milk material); then ripening the so treated milk material for a sufficient length of time until a liver like coagulum is formed of the desired lactic acid content; if a coagulum of about 0.3% lactic acid is desired, sufficient rennet is added so that coagulation of the treated milk material takes place on or before the lactic acid bacteria have developed 0.3% acid. The fourth step is to break up the coagulum containing the coagulated albumen and casein and precipitate the same into minutely divided, fixed, or non-adherent particles by agitating and simultaneously heating the same to pasteurizing temperature or higher. The fifth step consists in removing the surplus fluid from the treated milk material by evaporation or by concentrating the same to about from one half to one fourth of its original volume, according to the total solids content of the treated milk material, in vacuo or other suitable apparatus. The finished product is of semi-solid consistency or of cream cheese like appearance. Its lactic acid content is increased with the degree of concentration and may be comparatively low when the product is intended for fresh consumption and sufficiently high or of self preserving quantity when packed in air tight containers and held for considerable length of time. Its content of minutely divided, fixed, particles of milk protein, consisting of albumen and casein, is of soft body and texture. Its serum is practically free from colloidal or suspended albumen and casein. The finished product of semi-solid consistency may be dried by removing practically all of its moisture in the usual manner; it is free from colloidal or non-coagulated albumen and casein, in fact practically all of its albumen and casein is in the form of minutely divided, fixed, and non-adherent particles, in that it differs from a dried milk made from sweet milk material containing its albumen and casein in noncoagulated form and which by the addition of water forms an emulsion similar to that of its original or colloidal state.

In practicing my invention I prefer to proceed as follows:

*Example I.*—To produce an acid milk food product of semi-fluid consistency, 100 lbs. of sweet skimmed milk are placed in a steam jacketed forewarmer fitted with an agitator, and heated to the boiling point or to about 210 to 212 degrees Fahrenheit. The total normal solid content of the skimmed milk used may be increased above normal by adding concentrated skim milk or whole milk or cream. The so increased protein content of the treated milk results in a correspondingly heavier consistency of the finished product. The milk is left to remain for about from 10 to 20 minutes at this temperature to cause practically all of its albumen to coagulate this is the first step of my process. The second step consists in cooling the so treated milk to the desired ripening temperature, in this case to about 68 degrees Fahrenheit; then, as the third step, from 3 to 5 pounds of a previously prepared starter containing a suitable strain or strains of lactic acid bacteria is added. The so inoculated skim milk is left to ripen from 12 to 16 hours until sufficient lactic acid has developed so that the mass is in the form of a soft liver like coagulum. The coagulum consists of both the albumen and casein, is of extremely smooth appearance due to the coagulation of its albumen previous to fermenting the milk. In this state the coagulum is agitated and the smooth mass is cooled to about 40 degrees Fahrenheit and is then ready for consumption as a milk food; its normal moisture content is retained by applying in this case only the first 3 steps of my process. Coagulating the albumen content of the fresh milk material previous to fermenting the same is necessary to produce a coagulum consisting of both the coagulated albumen and casein and this combination is an essential feature of my process to produce milk protein particles of minutely divided, fixed, and non-adherent form of soft body and texture. The steps as described of treating the milk material are necessary to obtain a coagulum containing both the coagulated albumen and casein to produce a serum practically free from non-coagulated albumen and casein so that the serum contains practically only mineral matter, lactic acid and sugar of milk in solution, and that such treatment as described produces milk protein particles of soft body and texture.

*Example II.*—300 lbs. of sweet skimmed milk, obtained by removing the butterfat in the form of cream from fresh milk, are placed in a steam jacketed forewarmer, fitted with an agitator, and heated by steam to the boiling point or to about 210 to 212 degrees Fahrenheit. Any other suitable means or apparatus may be used for heating the milk to the boiling point, like steam jets or noiseless steam heaters or so called double pipe heaters or flash pasteurizers. The milk is left to remain for about from 10 to 20 minutes at this temperature to cause practically all of its albumen to coagulate, this is the first step of my process. The second step consists in cooling the so treated skimmed milk to the desired ripening temperature, in this case to about 80 degrees Fahrenheit; then, as the third step, from 3 to 10 lbs. of a previously prepared starter containing *Bacillus bulgaricus* or other suitable lactic acid bacteria is added. The so inoculated skimmed milk is left to ripen for from 12 to 48 hours until a titratable acid content of from about 1% to 1.5% is obtained, figured as lactic acid. The percentage of lactic acid however, may be increased to as high as about 2%, according to the strain of bacteria used in the starter and the amount of lactic desired in the finished product in excess of the amount sufficient for the self preservation of the finished product. The time of ripening depends somewhat on the temperature and the percentage of lactic acid desired. In addition to the lactic acid starter, rennet together with a small amount of calcium chloride may be added to form a more firm coagulum if desired. At the end of the ripening period the treated or fermented milk, having obtained its degree of desired lactic acid, is in the form of a clabber or soft liver like coagulum containing both albumen and casein. As the fourth step of the process, the coagulum is now broken up into minutely divided, fixed, and non-adherent particles which are of soft body and texture, by agitating and simultaneously heating the same to pasteurizing temperature, or higher, in suitable apparatus which may consist of a steam jacketed forewarmer with agitator or other apparatus or means for producing the same effect. Coagulating the albumen in the fresh milk material previous to fermenting the same is necessary to produce a coagulum consisting of both the coagulated albumen and casein and this combination is an essential feature of my process to produce milk protein particles of minutely divided, fixed, and non-adherent form of soft body and texture. The steps as described of treating the milk material are necessary to obtain a coagulum containing both the coagulated albumen and casein to produce a serum practically free from non-coagulated albumen and casein, so that the serum contains practically only mineral matter, lactic acid and sugar of milk in solution, and that such treatment as described, produces milk protein particles of soft body and texture. The fifth step consists in removing the surplus fluid or moisture in vacuo or other suitable evaporating apparatus, and is so timed that a concentration to about one third of its original volume takes place. The degree of concentration, however, may vary according to the total solid content of the milk material treated. The finished product is about 100 lbs. by weight and has a total solid content of about 27%, including a lactic acid content of from 3% to 4.5% and is of semi-solid consistency, with its milk protein content in the form of minutely divided particles, non-adherent to each other, of soft body and texture and with its serum free from non-coagulated albumen. It is then packed in air tight containers and is ready to be used as a food material. If desired, however, the product may be homogenized before packing the same. The fifth step, as described, produces a finished product of semisolid consistency. For making a dry product from the same, evaporation of the surplus fluid is so timed that the consistency of the product is in the form of a heavy liquid so that it may be drawn through a pump and forced through a spray into a drying chamber, or it may be spread on the hot surface of a rotating drum drier and drying the same in the usual manner.

*Example III.*—400 lbs. of buttermilk, preferably buttermilk churned from neutralized cream, are placed in a steam jacketed forewarmer fitted with an agitator and heated in the usual manner by simultaneously agitating the same to the boiling point or to about 210 degrees to 212 degrees Fahrenheit. Any other suitable means or apparatus may be used for heating and agitating the buttermilk, like steam jets or noiseless steam heater or so called double pipe heaters or flash pasteurizers. The buttermilk is left to remain for about 10 to 20 minutes at this temperature to cause practically all of its albumen to coagulate, as the first step of this process. The second step consists in cooling the so treated buttermilk to the desired ripening temperature, in this case to about 90 degrees Fahrenheit; then, as the third step, from 5 to 20 lbs. of a previously prepared starter containing *Bacillus bulgaricus* or other suitable lactic acid bacteria, is added. The so inoculated buttermilk is left to ferment for from 24 to 48 hours until a titratable acid content of from 1% to 2% is obtained, figured as lactic acid, depending on the amount of lactic acid desired in the finished product in excess of a self-preserving lactic acid content. The time of ripening depends somewhat on the temperature and the percentage of lactic acid desired in the finished product. The fermented buttermilk having obtained the desired lactic acid content, then, as the fourth step of the process, is now agitated and simultaneously heated to pasteurizing temperature or higher in suitable apparatus for the purpose of breaking up its coagulated albumen and casein into minutely divided, fixed, and non-adherent particles of soft body and texture. Coagulating the albumen in the buttermilk previous to fermenting the same, is necessary to produce a coagulum of both the coagulated albumen and casein and this combination is an essential feature of my proces to produce milk protein particles of minutely divided, fixed, and non-adherent form of soft body and texture and a serum practically free from non-coagulated albumen and casein. The fifth step consists in removing the surplus fluid or moisture in vacuo or by other suitable apparatus and is so timed that a concentration to about from ⅓ to ¼ of its original volume takes place according to the total solid content of the buttermilk treated. The finished product is about 100 lbs. by weight and has a total solid content of about 28%, including a lactic acid content from 3% to 8% and is of semi solid consistency with its milk protein content in the form of minutely divided particles, fixed, and non-adherent to each other, of soft body and texture and with its serum free from non-coagulated albumen. The lactic acid content is of self-preserving quantity. The finished product is then packed in air tight containers and is ready to be used as food material. In case it is desired to dry the above described finished product, the fifth step of the process may be so timed that the consistency of the treated buttermilk is in the form of a heavy liquid so that it may be drawn through a pump and forced through a spray into a drying chamber, or it may be spread on the hot surface of a rotating drum drier for drying the same in the usual manner.

*Example IV.*—In the following I describe a process for making an acid milk product, rich in butterfat similar to cream cheese in texture and containing all of the original milk constituents of the milk material used. In this case I start with 250 lbs. of cream containing 16% butterfat, preferably homogenized to prevent separation of butterfat during the subsequent heating process; such cream contains about 24% total solids, of which 2 parts or 16% are butterfat and one part, or 8%, non-fatty solids. The homogenized cream is placed in a steam jacketed forewarmer, fitted with an agitator, and heated by steam to the boiling point or about 210 degrees Fahrenheit. Any other suitable means or apparatus may be used for heating the cream to the boiling point, like steam jets or noiseless steam heaters or so called double pipe heaters or flash pasteurizers. The cream is left to remain for about 10 to 20 minutes at above stated temperatures to cause practically all of its albumen to coagulate; this is the first step of my process. The second step consists in cooling the treated cream to the desired ripening temperature, in this case to about 75 degrees Fahrenheit; then, as the third step, from 3 to 10 lbs. of a previously prepared starter containing suitable lactic acid bacteria, is added. In addition to the starter some rennet may be added plus a small amount of calcium chloride, to cause a more firm coagulum. The treated cream, having obtained the desired degree of lactic acid, in this case of about 0.4%, forms a clabber or soft liver like coagulum, which consists of the coagulated albumen and casein, is now subjected to the fourth step of my process. The coagulum is broken up into minutely divided, fixed, and non-adherent particles, which are of soft body and texture, by agitating and simultaneously heating the same to pasteurizing temperature or higher, in suitable apparatus which may consist of a steam jacketed forewarmer fitted with agitator, or other apparatus or means for producing the same effect. Coagulating the albumen in the fresh milk material, rich in butterfat, previous to fermenting the same, is necessary to produce a coagulum consisting of both the albumen and casein and this combination is an essential feature of my process to produce milk protein particles of minutely divided, fixed, and non-adherent form of soft body and texture. The four steps as described of treating the rich milk or cream, are necessary to obtain a coagulum containing both the coagulated albumen and casein and to produce a serum practically free from non-coagulated albumen and casein and containing practically only mineral matter, lactic acid and sugar of milk in solution, and that such treatment as described, produces milk protein particles of soft body and texture. The fifth step consists in removing the desired surplus fluid or moisture in vacuo or other suitable evaporating apparatus and is so timed that a concentration to about ½ to ⅖ of its original volume takes place. The finished product is of semisolid consistency and has a total solid content of about 48% when the degree of concentration is carried to one half of its original volume and is 60% when concentrated to about ⅖ of its original volume by weight. The yield of the finished product in the first instance is about 125 lbs. and in the second instance about 100 lbs. It is then packed in suitable containers and is ready to be used as a food material.

In the four examples I have described my process for making an acid milk food product of semi-fluid consistency, of semi-solid consistency and in the dry form, from skimmed milk, buttermilk and cream. However milk material free from butterfat or of normal content of butterfat or rich in butterfat, may be processed and the lactic acid fermentation may be so timed that the finished product contains a minimum percentage of lactic acid of from about 0.6% to a maximum lactic acid content of about 8% and any of such finished products may be reduced from its semisolid state to the dry state by removing practically all of its moisture content. Furthermore in order to produce flavor or taste, salt or sugar may be added before any of the surplus fluid of the treated milk material is removed.

What I claim as new is:

1. The process of producing an acid milk food product particularly free from non-coagulated albumen and casein of semi-fluid form from milk products of the class consisting of skimmed milk, buttermilk, part whole milk, whole milk, enriched milk, cream, re-constituted cream and milk which consists in coagulating practically all of its albumen by the agency of heat, previous to souring or fermenting the same, then fermenting the same to form a coagulum containing the coagulated albumen and casein, then precipitating the coagulated albumen and casein by breaking up the coagulum by the agency of heat and simultaneous agitation to keep the precipitated albumen and casein or milk protein particles out of continuous contact, then increasing the heat to pasteurizing temperature or higher to fix the said milk protein particles into minutely divided, fixed, and non-adherent form of soft body and texture, then evaporating the surplus moisture or fluid.

2. The process of producing an acid milk food product particularly free from non-coagulated albumen and casein of semi-fluid form from milk products of the class consisting of skimmed milk, buttermilk, part whole milk, whole milk, enriched milk, cream, re-constituted cream and milk, which consists in coagulating practically all of its albumen by the agency of heat previous to souring or fermenting the same, then fermenting the same to form a coagulum containing the coagulated albumen and casein, then precipitating the coagulated albumen and casein by breaking up the coagulum by the agency of heat and simultaneous agitation to keep the precipitated albumen and casein or milk protein particles out of continuous contact, then increasing the heat to pasteurizing temperature or higher to fix the said milk protein particles into minutely divided, fixed, and non-adherent form of soft body and texture, then evaporating the surplus moisture or fluid, the remaining moisture or fluid being practically free from non-coagulated albumen and containing a lactic acid content varying from a non-preserving content to a self-preserving content or higher.

3. The process of producing an acid milk food product particularly free from non-coagulated albumen and casein of semi-fluid form from milk products of the class consisting of skimmed milk, buttermilk, part whole milk, whole milk, enriched milk, cream, reconstituted cream and milk, which consists in coagulating practically all of its albumen by the agency of heat, previous to souring or fermenting the same, then fermenting the same to form a coagulum containing the coagulated albumen and casein, then precipitating the coagulated albumen and casein by breaking up the coagulum by the agency of heat and simultaneous agitation to keep the precipitated albumen and casein or milk protein particles out of continuous contact, then increasing the heat to pasteurizing temperature or higher to fix the said milk protein particles into minutely divided, fixed, and non-adherent form of soft body and texture, then removing part of its moisture by evaporation in vacuo before drying the same in the usual manner.

4. An acid milk food product of semisolid consistency containing substantially all of the solid constituents of the original milk having its coagulated and precipitated albumen and casein content in the form of minute, fixed, and non-adherent particles of soft body and texture and containing a serum practically free from albumen.

WILLIAM P. M. GRELCK.